US012489583B2

(12) United States Patent
Tsujimaru

(10) Patent No.: US 12,489,583 B2
(45) Date of Patent: Dec. 2, 2025

(54) COMMUNICATION APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Yuki Tsujimaru, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 392 days.

(21) Appl. No.: 17/977,238

(22) Filed: Oct. 31, 2022

(65) Prior Publication Data
US 2023/0063592 A1 Mar. 2, 2023

Related U.S. Application Data

(63) Continuation of application No. PCT/JP2021/014483, filed on Apr. 5, 2021.

(30) Foreign Application Priority Data

May 18, 2020 (JP) ................... 2020-086913

(51) Int. Cl.
*H04L 5/00* (2006.01)
*H04W 72/0453* (2023.01)
*H04W 72/23* (2023.01)

(52) U.S. Cl.
CPC ....... *H04L 5/0053* (2013.01); *H04W 72/0453* (2013.01); *H04W 72/23* (2023.01)

(58) Field of Classification Search
CPC ............... H04L 5/0053; H04L 5/0094; H04W 72/0453; H04W 72/23; H04W 84/12
See application file for complete search history.

(56) References Cited

U.S. PATENT DOCUMENTS

2006/0080423 A1* 4/2006 Brewer .................. G06K 15/00
709/223
2017/0171796 A1* 6/2017 Wu ........................ H04W 48/16
(Continued)

FOREIGN PATENT DOCUMENTS

CN 110831107 A 2/2020
CN 111162885 A 5/2020
(Continued)

OTHER PUBLICATIONS

Notice of Reasons for Refusal issued by the Japanese Patent Office on Jul. 29, 2024 in corresponding JP Patent Application No. 2020-086913, with English translation.
(Continued)

*Primary Examiner* — Awet Haile
(74) *Attorney, Agent, or Firm* — Carter, DeLuca & Farrell LLP

(57) ABSTRACT

A communication apparatus, complying with a standard of an IEEE802.11 series, comprises: communication unit configured to communicate, with another communication apparatus, operation information concerning wireless communication, wherein the operation information includes frequency bandwidth information for wireless communication, the frequency bandwidth information is included in Channel Width field included in EHT Operation field of a frame complying with a standard of an IEEE802.11 series, and the frequency bandwidth is indicated using a value selected from a plurality of values including at least a first value and a second value, wherein the first value indicates 160 MHz, and the second value indicates 320 MHz

11 Claims, 4 Drawing Sheets

(56) References Cited

U.S. PATENT DOCUMENTS

| | | | |
|---|---|---|---|
| 2018/0034707 A1* | 2/2018 | Aoki | H04L 41/145 |
| 2019/0116545 A1 | 4/2019 | Verma | |
| 2019/0281614 A1 | 9/2019 | Chen | |
| 2019/0289612 A1 | 9/2019 | Chen | |
| 2019/0297561 A1 | 9/2019 | Asterjadhi | |
| 2019/0327740 A1* | 10/2019 | Verma | H04L 5/008 |
| 2020/0275369 A1* | 8/2020 | Foster | H04W 52/322 |
| 2021/0153210 A1* | 5/2021 | Li | H04W 72/23 |
| 2023/0007571 A1* | 1/2023 | Huang | H04L 5/0094 |
| 2023/0042842 A1* | 2/2023 | Yu | H04L 5/0098 |
| 2023/0328548 A1* | 10/2023 | Stacey | H04W 48/12 370/252 |
| 2023/0403634 A1* | 12/2023 | Huang | H04L 5/0094 |

FOREIGN PATENT DOCUMENTS

| | | |
|---|---|---|
| JP | 2018050133 A | 3/2018 |
| JP | 2019213195 A | 12/2019 |
| WO | 2020/027847 A1 | 2/2020 |
| WO | 2020031682 A1 | 2/2020 |

OTHER PUBLICATIONS

Examination Report issued by the Indian Patent Office on Dec. 19, 2023 in corresponding Indian Patent Application No. 202247067559.

Taiwan Office Action issued in corresponding TW Patent Application No. 112140726, dated Sep. 13, 2024, pp. 1-8.

Extended European Search Report issued by the European Patent Office on Jun. 10, 2024 in corresponding EP Patent Application No. 21808483.8.

Guo, J. Y. et al., "EHT Operation Element for 320MHz" IEEE 802.11-20/0624r0 (Mar. 2020) pp. 1-11.

Taiwan Office Action issued in corresponding TW Patent Application No. 110114265, dated Dec. 12, 2022, pp. 1-10.

International Search Report issued by the Japan Patent Office on Jun. 29, 2021 in corresponding International Application No. PCT/JP2021/014483, with English translation.

Huang, P-K, et al., "320 MHz BSS Configuration" IEEE 802.11-20/0384r1 (Feb. 6, 2020), https://view.officeapps.live.com/op/view.aspx?src=https%3A%2F%2Fmentor.ieee.org%2F802.11%2Fdcn%2F20%2F11-20-0384-01-00be-320-mhz-bss-configuration.pptx&wdOrigin=BROWSELINK, pp. 1-10.

Po-Kai Huang, "320 MHz BSS Configuration", IEEE 802.11-20/0668r1, Apr. 18, 2020, https://view.officeapps.live.com/op/view.aspx?src=https%3A%2F%2Fmentor.ieee.org%2F802.11%2Fdcn%2F20%2F11-20-0668-01-00be-320-mhz-bss-configuration.pptx&wdOrigin=BROWSELINK.

Notice of Reasons for Refusal issued by the Japanese Patent Office on Dec. 9, 2024 in corresponding JP Patent Application No. 2020-086913, with English translation.

Chinese Office Action issued by the China National Intellectual Property Administration on May 29, 2025 in corresponding CN Patent Application No. 202180035452.1, with English translation.

Korean Office Action issued in corresponding KR Patent Application No. 10-2022-7043075, dated Apr. 1, 2025, with English translation.

* cited by examiner

COMMUNICATION APPARATUS, CONTROL METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2021/014483, filed Apr. 5, 2021, which claims the benefit of Japanese Patent Application No. 2020-086913 filed on May 18, 2020, both of which are hereby incorporated by reference herein in their entirety.

BACKGROUND OF THE INVENTION

Field of the Invention

The present invention relates to a wireless communication technique.

Background Art

The IEEE802.11 series is known as a wireless LAN (Local Area Network) communication standard defined by IEEE (Institute of Electrical and Electronics Engineers). The IEEE802.11 series standards include the IEEE802.11a/b/g/n/ac/ax standards.

PTL 1 discloses that wireless communication by OFDMA (Orthogonal Frequency Division Multiple Access) is executed in the IEEE802.11ax standard. In the IEEE802.11ax standard, high peak throughput is achieved by executing wireless communication by OFDMA.

To further improve throughput or frequency use efficiency, IEEE has examined the definition of the IEEE802.11be standard as a new standard of the IEEE802.11 series. In the IEEE802.11be standard, it has been examined to extend the frequency bandwidth up to 320 MHz.

CITATION LIST

Patent Literature

PTL 1: Japanese Patent Laid-Open No. 2018-50133

An AP (Access Point) and an STA (station/terminal apparatus) manage operation information used for wireless communication, such as a communication bandwidth used for wireless communication. Conventionally, in the case of wireless communication using 240 MHz as a frequency bandwidth, there is no method of representing operation information concerning 80 MHz on the high frequency side (that is, 80 MHz in the latter half) of the frequency bandwidth.

The present disclosure has been made in consideration of the above problem, and provides a technique for appropriately communicating operation information for wireless communication when performing wireless communication in a frequency bandwidth of 240 MHz or more.

SUMMARY OF THE INVENTION

In order to achieve the above object, a communication apparatus according to one aspect of the present invention has the following configuration. That is, there is provided a communication apparatus complying with a standard of an IEEE802.11 series, comprising communication unit configured to communicate, with another communication apparatus, operation information concerning wireless communication, wherein the operation information includes frequency bandwidth information for wireless communication, the frequency bandwidth information is included in Channel Width field included in EHT Operation field of a frame complying with a standard of an IEEE802.11 series, and the frequency bandwidth is indicated using a value selected from a plurality of values including at least a first value and a second value, wherein the first value indicates a frequency bandwidth of 160 MHz, and the second value indicates a frequency bandwidth of 320 MHz.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
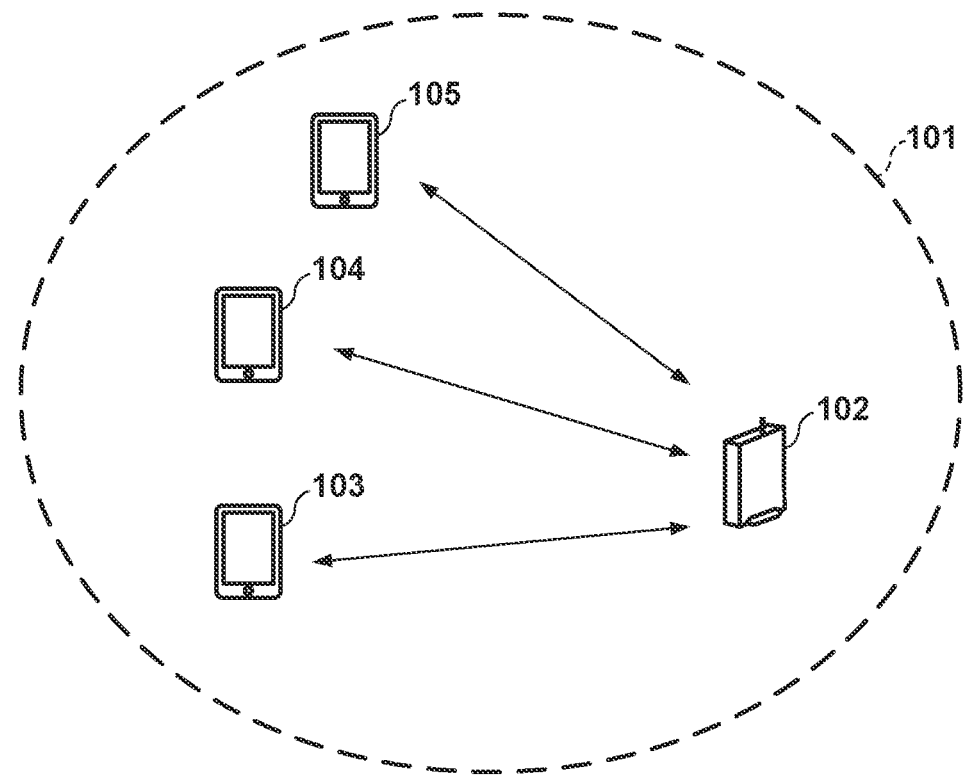
FIG. 1 is a view showing an example of the configuration of a wireless communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

[Configuration of System]

FIG. 1 shows a wireless communication system according to this embodiment. The wireless communication system shown in FIG. 1 is a wireless network including, as communication apparatuses, an access point (AP) 102 and a plurality of STAs (stations/terminal apparatuses) 103, 104, and 105. The AP 102 has the same function as that of the terminal apparatus except for a relay function, and is thus a form of the terminal apparatus. The AP 102 can communicate with each of the STAs 103 to 105 in accordance with a wireless communication method complying with the IEEE802.11be standard. The STAs 103 to 105 existing inside a circle 101 representing a range within which a signal (radio frame) transmitted by the AP 102 reaches can communicate with the AP 102.

This embodiment assumes that the AP 102 and each of the STAs 103 to 105 can communicate with each other in accordance with the IEEE802.11be standard. The AP 102 establishes a wireless link with each of the STAs 103 to 105 via a predetermined association process and the like. The AP 102 and each of the STAs 103 to 105 can communicate with each other in the 2.4-, 5-, and 6-GHz frequency bands. The frequency band used by the AP 102 and each of the STAs 103 to 105 is not limited to them and, for example, a different frequency band such as the 60-GHz band may be used. The AP 102 and each of the STAs 103 to 105 can communicate with each other using 20-, 40-, 80-, 160-, 240-, and 320-MHz bandwidths.

The AP 102 and each of the STAs 103 to 105 can execute OFDMA communication. For example, the AP 102 can implement multi-user (MU) communication of multiplexing signals destined for a plurality of users (STAs). In OFDMA communication, some (RUs (Resource Units)) of divided frequency bands are allocated to the respective STAs not to overlap each other, and carrier waves allocated to the respective STAs are orthogonal to each other. Therefore, the AP 102 can simultaneously communicate with the plurality of STAs.

The AP 102 and each of the STAs 103 to 105 can transmit/receive a management frame complying with an IEEE802.11 series standard, which is, for example, a MAC (Medium Access Control) frame. More specifically, the management frame indicates each of a Beacon frame, Probe Request/Response frames, and Association Request/Response frames. In addition to these frames, a Disassociation frame, an Authentication frame, a De-Authentication frame, and an Action frame are also called management frames. The Beacon frame is a frame that makes a notification of network information. The Probe Request frame is a frame that requests network information, and the Probe Response frame is a response to the Probe Request frame and is a frame that provides the network information. The Association Request frame is a frame that requests connection, and the Association Response frame is a response to the Association Request frame and is a frame that indicates permission of connection or an error. The Disassociation frame is a frame used to disconnect the connection. The Authentication frame is a frame used to authenticate the partner apparatus. The De-Authentication frame is a frame used to interrupt authentication of the partner apparatus and execute disconnection of the connection. The Action frame is a frame used to execute an additional function other than the above-described ones.

The AP 102 and the STAs 103 to 105 may be configured to execute MIMO (Multiple-Input and Multiple-Output) communication. In this case, each of the AP 102 and the STAs 103 to 105 includes a plurality of antennas, and the transmission side uses the same frequency channel to transmit different signals from the respective antennas. The reception side simultaneously receives, using the plurality of antennas, all signals arriving from a plurality of streams, separates the signals of the streams, and decodes them. As compared with a case in which no MIMO communication is executed, the AP 102 and each of the STAs 103 to 105 can communicate more data at the same time by executing MIMO communication. The AP 102 and the STAs 103 to 105 manage operation parameters (operation information) such as a communication bandwidth (frequency bandwidth) used for wireless communication.

Note that each of the AP 102 and the STAs 103 to 105 supports the IEEE802.11be standard. In addition to this, each of the AP 102 and the STAs 103 to 105 may support at least one of the legacy standards as standards defined before the IEEE802.11be standard. The legacy standards indicate the IEEE802.11a/b/g/n/ac/ax standards. Note that in this embodiment, at least one of the IEEE802.11a/b/g/n/ac/ax/be standards is called an IEEE802.11 series standard. Furthermore, in addition to the IEEE802.11 series standard, each of the AP 102 and the STAs 103 to 105 may support another communication standard such as Bluetooth®, NFC (Near Field Communication), UWB (Ultra Wideband), Zigbee, or MBOA (Multiple Band OFDM Alliance). UWB includes wireless USB, wireless 1394, and Winet. In addition, each of the AP 102 and the STAs 103 to 105 may support a communication standard of wired communication such as a wired LAN.

[Arrangement of Communication Apparatus]

Figure 2A:
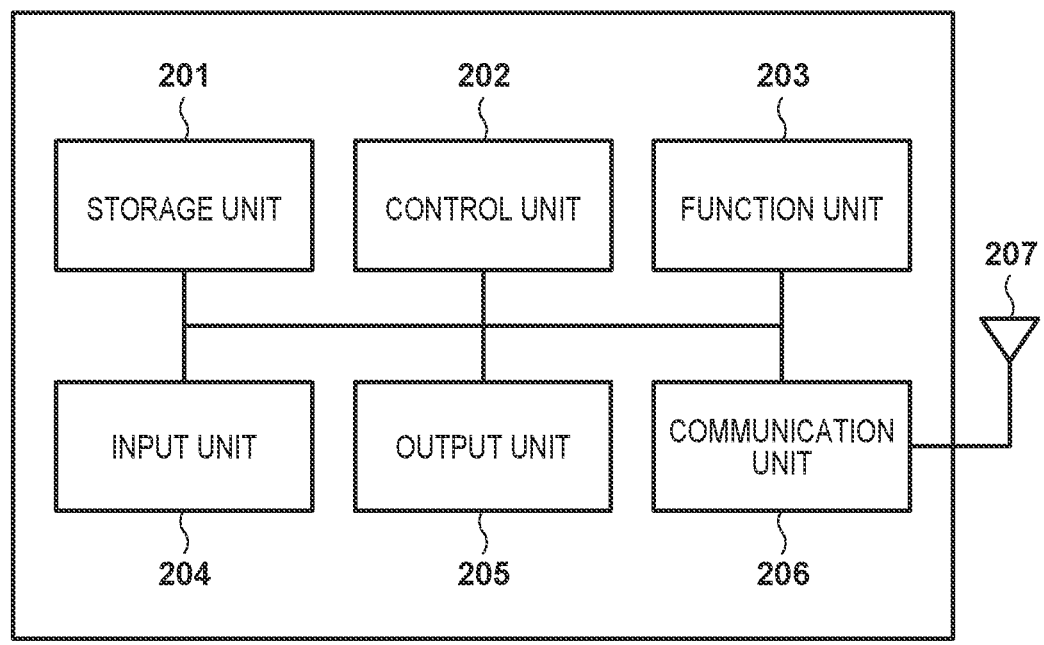
FIG. 2A is a block diagram showing an example of the hardware arrangement of a communication apparatus.

FIG. 2A shows an example of the hardware arrangement of the communication apparatus (AP 102 and STAs 103 to 105) according to this embodiment. The communication apparatus includes, as an example of the hardware arrangement, a storage unit 201, a control unit 202, a function unit 203, an input unit 204, an output unit 205, a communication unit 206, and an antenna 207.

The storage unit 201 is formed by one or more memories such as a ROM (Read Only Memory) and a RAM (Random Access Memory), and stores computer programs for performing various operations (to be described later), and various kinds of information such as communication parameters for wireless communication. Note that in addition to the memory such as a ROM or a RAM, a storage medium such as a flexible disk, a hard disk, an optical disk, a magneto-optical disk, a CD-ROM, a CD-R, a magnetic tape, a nonvolatile memory card, or a DVD may be used as the storage unit 201. The storage unit 201 may include a plurality of memories.

The control unit 202 is formed by, for example, one or more processers such as a CPU (Central Processing Unit) and an MPU (Micro Processing Unit), and controls the communication apparatus by executing the computer programs stored in the storage unit 201. Note that the control unit 202 may be configured to control the communication apparatus by cooperation of an OS (Operating System) and the computer programs stored in the storage unit 201. The control unit 202 generates data or a signal (radio frame) to be transmitted in communication with another communication apparatus. The control unit 202 may include a plurality of processors such as a multi-core processor, and control the communication apparatus by the plurality of processors.

In addition, the control unit 202 controls the function unit 203 to execute wireless communication or predetermined processing such as image capturing, printing, or projection processing. The function unit 203 is hardware used by the communication apparatus to execute predetermined processing.

The input unit 204 accepts various kinds of operations from the user. The output unit 205 performs various kinds of outputs to the user via a monitor screen or a loudspeaker. In this example, the output by the output unit 205 may include, for example, display on the monitor screen, audio output by the loudspeaker, and vibration output. Note that both the input unit 204 and the output unit 205 may be implemented by one module, like a touch panel. Furthermore, each of the input unit 204 and the output unit 205 may be integrated with the communication apparatus, or may be separated from the communication apparatus.

The communication unit 206 controls wireless communication complying with the IEEE802.11be standard. In this embodiment, the communication unit 206 serves as a means for notifying (transmitting) another communication apparatus of operation information (to be described below). The communication unit 206 may control wireless communication complying with another IEEE802.11 series standard in addition to the IEEE802.11be standard, or control wired communication by a wired LAN or the like. The communication unit 206 controls the antenna 207 to transmit/receive signals (radio frames) for wireless communication generated by the control unit 202. Note that if the communication apparatus supports the NFC standard or Bluetooth standard in addition to the IEEE802.11be standard, the communication unit 206 may control wireless communication complying with these communication standards. If the communication apparatus can execute wireless communication complying with each of a plurality of communication standards, it may have an arrangement that separately includes a communication unit and an antenna supporting each communication standard. The communication apparatus communicates data such as image data, document data, or video data with another communication apparatus via the communication unit 206. Note that the antenna 207 may be arranged separately from the communication unit 206 or may be configured as a module integrated with the communication unit 206.

The antennas 207 is an antenna that allows communication in the 2.4-, 5-, and 6-GHz bands. The communication apparatus may include one antenna, or may include antennas different for the respective frequency bands. If the communication apparatus includes a plurality of antennas, it may include the communication unit 206 corresponding to each antenna.

Figure 2B:
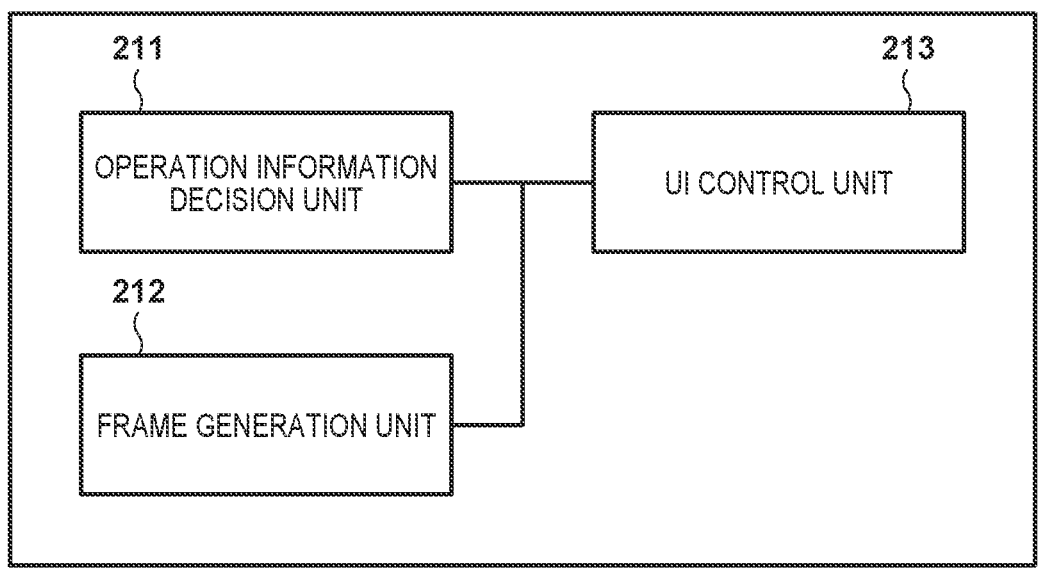
FIG. 2B is a block diagram showing an example of the functional arrangement of the communication apparatus.

FIG. 2B shows an example of the functional arrangement by the control unit 202 of the communication apparatus (AP 102 and STAs 103 to 105) according to this embodiment. The communication apparatus includes, as an example of the functional arrangement, an operation information decision unit 211, a frame generation unit 212, and a UI (User Interface) control unit 213.

The operation information decision unit 211 decides operation information of which another communication apparatus is notified. The operation information will be described later. The frame generation unit 212 generates a frame used for transmission (notification) to another communication apparatus. The UI control unit 213 executes control to accept an operation on the communication apparatus by the user of the communication apparatus. For example, the UI control unit 213 sets, in the communication apparatus, contents input by the user and obtained from the input unit 204 by, for example, sending them to the operation information decision unit 211.

[Structure of EHT Operation Element]

Figure 3:
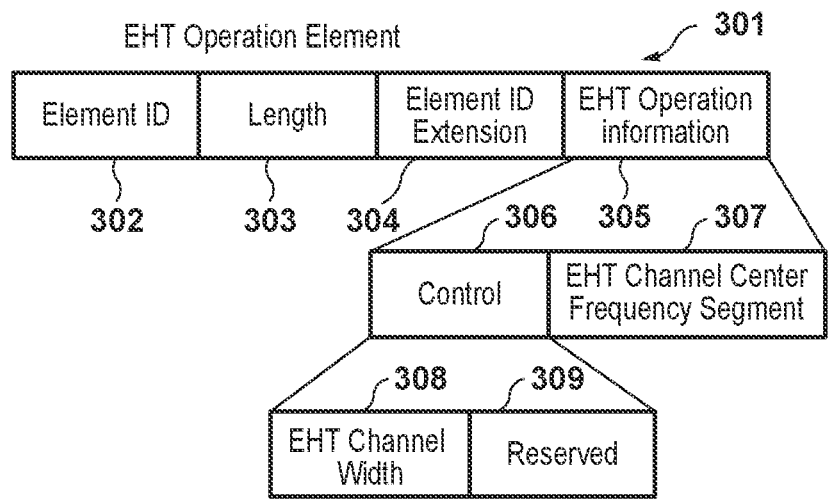
FIG. 3 is a view showing an example of the structure of an EHT Operation Element.

In this embodiment, it is possible to notify another communication apparatus of the operation information using a management frame complying with a standard of the IEEE802.11 series. Note that a notification of the operation information may be made using another kind of frame. FIG. 3 shows an example of the structure of an EHT Operation Element 301 as one of information elements of the management frame.

With respect to an Element ID field 302, a Length field 303, and an Element ID Extension field 304, a reference is made to a description of Table 1 below. An EHT Operation Information field 305 includes operation information for wireless communication. The operation information includes information for designating a use frequency bandwidth and the like. The information of the use frequency bandwidth can be designated by a combination of an EHT Channel Center Frequency Segment field 307 (frequency information for wireless communication) included in the EHT Operation Information field 305 and an EHT Channel Width field 308 (frequency bandwidth information for wireless communication) included in a Control field 306. For example, if the EHT Channel Width field 308 has 0, and the EHT Channel Center Frequency Segment field 307 has 0, this can indicate that the use frequency bandwidth is 160 MHz or less. If the EHT Channel Width field 308 has 0 and the EHT Channel Center Frequency Segment field 307 has a value other than 0, this can indicate that the use frequency bandwidth is 240 MHz. If the EHT Channel Width field 308 has 1, this can indicate that the use frequency bandwidth is 320 MHz.

The EHT Channel Center Frequency Segment field 307 represents information concerning a channel used for 80 MHz or 160 MHz in the latter half/on the high frequency side (for example, 80 MHz or 160 MHz on the high frequency side including the maximum frequency of the frequency bandwidth, or secondary 80 MHz or 160 MHz) if the use frequency bandwidth is 240 MHz or more. If the use frequency bandwidth is 160 MHz or less, the EHT Channel Center Frequency Segment field 307 can indicate 0. If the use frequency bandwidth is 240 MHz, the EHT Channel Center Frequency Segment field 307 is as following. The EHT Channel Center Frequency Segment field 307 can indicate a channel value corresponding to the center frequency of 160 MHz on the high frequency side if the use frequency bandwidth is 240 MHz, indicate a channel value corresponding to the center frequency of 80 MHz on the high frequency side if the use frequency bandwidth is 160+80 MHz, indicate a channel value corresponding to the center frequency of 160 MHz on the high frequency side if the use frequency bandwidth is 80+160 MHz, and indicate a channel value corresponding to the center frequency of 80 MHz on the high frequency side if the use frequency bandwidth is 80+80+80 MHz. In the case in which the use frequency bandwidth is 320 MHz, the EHT Channel Center Frequency Segment field 307 can indicate a channel value corresponding to the center frequency of secondary 160 MHz (for example, 160 MHz on the high frequency side) if the use frequency bandwidth is 160+160 MHz, and indicate a channel value corresponding to the lowest frequency of secondary 160 MHz if the frequency bandwidth is 320 MHz.

Tables 1, 2, and 3 show practical examples of the components of the EHT Operation Element 301 described above. Table 1 shows a description of each field of the EHT Operation Element 301, Table 2 shows a description of each subfield of the EHT Operation Information field 305, and Table 3 shows a description of each subfield of the Control field 306. The name and bit position and size of each field/subfield are not limited to those described in the tables, and pieces of similar information may be stored with different field/subfield names and sizes in a different order.

TABLE 1

| Subfield | Number of Bytes | Description |
| --- | --- | --- |
| EHT Operation Element | Element ID | 1 | This indicates that this management frame is EHT Operation Element. This is indicated by combination with Element ID Extension. |

TABLE 1-continued

| Subfield | Number of Bytes | Description |
|---|---|---|
| Length | 1 | This indicates length of EHT Operation Element. |
| Element ID Extension | 1 | This indicates, with Element ID, that this management frame is EHT Operation Element. |
| EHT Operation Information | 2 | This indicates information of frequency bandwidth and use frequency bandwidth if use frequency bandwidth is 240 MHz or more. |

TABLE 2

| Subfield | | Number of Bytes | Description |
|---|---|---|---|
| EHT Operation Information | Control | 1 | This indicates whether frequency bandwidth is 160 MHz or less or 240 MHz or more. Table 3 shows details. |
| | EHT Channel Center Frequency Segment | 1 | This indicates information concerning channel used for secondary 80 MHz or 160 MHz if frequency bandwidth is 240 MHz or more. This indicates 0 if frequency bandwidth is 160 MHz or less, channel value corresponding to center frequency of 160 MHz on high frequency side if frequency bandwidth is 240 MHz, a channel value corresponding to center frequency of 80 MHz on high frequency side if frequency bandwidth is 160 + 80 MHz, a channel value corresponding to center frequency of 160 MHz on high frequency side if frequency bandwidth is 80 + 160 MHz, a channel value corresponding to center frequency of 80 MHz on high frequency side if frequency bandwidth is 80 + 80 + 80 MHz, a channel value corresponding to lowest frequency of 160 MHz on high frequency side if frequency bandwidth is 320 MHz, and a channel value corresponding to center frequency of 160 MHz on high frequency side if frequency bandwidth is 160 + 160 MHz. |

TABLE 3

| | Bit Position | Subfield | Number of Bits | Description |
|---|---|---|---|---|
| Control | B0 | EHT Channel Width | 1 | This designates use frequency bandwidth in combination with EHT Channel Center Frequency Segment in Table 2. If EHT Channel Width field has 0 and EHT Channel Center Frequency Segment has 0, this indicates that use frequency bandwidth is 160 MHz or less. If EHT Channel Width field has 0 and EHT Channel Center Frequency Segment has value other than 0, this indicates that use frequency bandwidth is 240 MHz. If EHT Channel Width field has 1, this indicates that use frequency bandwidth is 320 MHz. |
| | B1-B7 | Reserved | 7 | reserved region |

[Description of Notification Procedure of Operation Information]

The notification procedure of the operation information having the above structure will be described with reference to FIGS. 4 to 7. In this embodiment, it is possible to notify another communication apparatus of the operation information using the management frame complying with the standard of the IEEE802.11 series. The operation information decision unit 211 decides/sets the operation information, the frame generation unit 212 generates a management frame including the operation information, and the generated frame is transmitted via the communication unit 206. Information of a use frequency bandwidth and a frequency in the frequency bandwidth (for example, information (a channel value or the like) of the center frequency of the frequency band in the frequency bandwidth) may be preset in the communication apparatus (AP 102 and STAs 103 to 105). Alternatively, these pieces of information may be set in the communication apparatus by inputting by the user of the communication apparatus via the input unit 204, and can be acquired by the communication apparatus by an arbitrary method.

Matters common to FIGS. 4 to 7 will now be described. A notification of information of 160 MHz on the low frequency side (in the former half) is made using a management frame defined by a legacy standard as a standard defined before the IEEE802.11be standard. That is, CCFS0, CCFS1, and Channel Width are values of which the communication apparatus is notified by the management frame defined by the legacy standard. CCFS0 represents a channel value corresponding to the center frequency of primary 80 MHz. CCFS1 represents a channel value corresponding to the center frequency of secondary 80 MHz (160 MHz obtained by combining with primary 80 MHz if it is adjacent to primary 80 MHz,). Channel Width has a value representing that primary 80 MHz and secondary 80 MHz are adjacent to each other. A notification of CCFS0, CCFS1, and Channel Width may be made by a VHT Operation element, an HT Operation element, and 6 GHz Operation information as elements of the management frame defined by the legacy standard. Note that in FIGS. 4 to 7, the respective channels are arranged to overlap each other in every 5 MHz. Furthermore, referring to FIGS. 4 to 7, expression (1) indicates the absolute value of the difference between CCFS0 and CCFS1, expression (2) indicates the absolute value of the difference between CCFS1 and EHT Channel Center Frequency Segment (field 307), and equation (3) indicates the value of EHT Channel Width (field 308).

Figure 4:
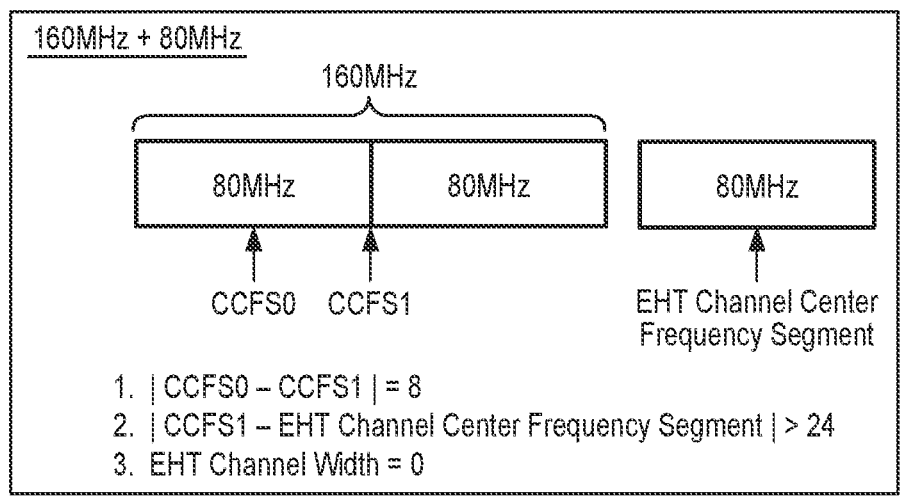
FIG. 4 is a view for explaining operation information of which a communication apparatus is notified if a frequency bandwidth of 160+80 MHz is used.

FIG. 4 is a view for explaining an example of the operation information of which the communication apparatus is notified if a frequency bandwidth of 160+80 MHz is used. As described above, a notification of CCFS0, CCFS1, and Channel Width as information of 160 MHz on the low frequency side (in the former half) of 160+80 MHz is made using the management frame defined by the legacy standard. In addition to the information of 160 MHz on the low frequency side, EHT Channel Center Frequency Segment (field 307) and EHT Channel Width (field 308) described above are used. At this time, EHT Channel Center Frequency Segment represents a channel value corresponding to the center frequency of 80 MHz on the high frequency side, and EHT Channel Width has a value of 0 indicating 240 MHz. Expression (2) in FIG. 4 indicates that 160 MHz on the low frequency side (in the former half) of 240 MHz is not adjacent to 80 MHz on the high frequency side (in the latter half). Furthermore, it is possible to make a notification of a frequency channel used for 160 MHz +80 MHz based on the values of CCFS0, CCFS1, and EHT Channel Center Frequency Segment.

Figure 5:
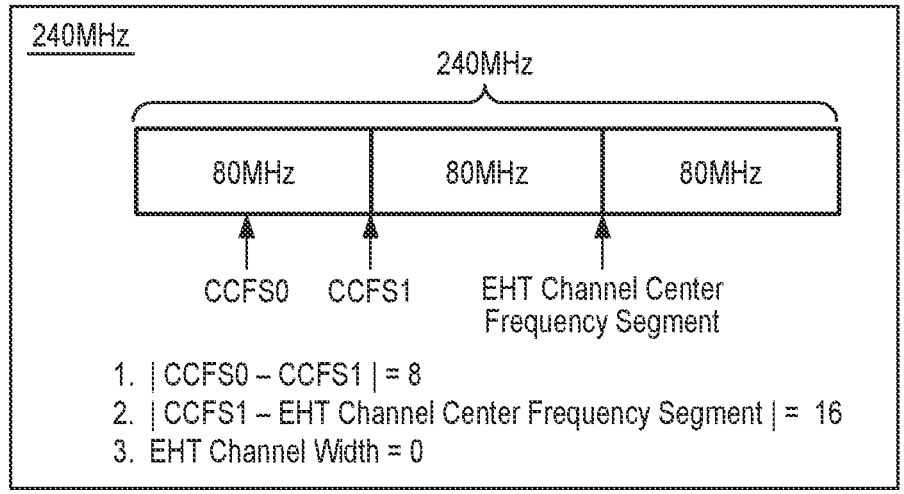
FIG. 5 is a view for explaining operation information of which a communication apparatus is notified if a frequency bandwidth of 240 MHz is used.

FIG. 5 is a view for explaining the operation information of which the communication apparatus is notified if a frequency bandwidth of 240 MHz is used. As described above, a notification of CCFS0, CCFS1, and Channel Width as information of 160 MHz on the low frequency side (in the former half) of 160+80 MHz is made using the management frame defined by the legacy standard. In addition to the information of 160 MHz on the low frequency side, EHT Channel Center Frequency Segment (field 307) and EHT Channel Width (field 308) described above are used. At this time, EHT Channel Center Frequency Segment represents a channel value corresponding to the center frequency of 160 MHz on the high frequency side, and EHT Channel Width has a value of 0 indicating 240 MHz. Expression (2) in FIG. 5 indicates that 160 MHz on the low frequency side (in the former half) of 240 MHz is adjacent to 80 MHz on the high frequency side (in the latter half). Furthermore, it is possible to make a notification of a frequency channel used for the frequency bandwidth of 240 MHz based on the values of CCFS0, CCFS1, and EHT Channel Center Frequency Segment.

Figure 6:
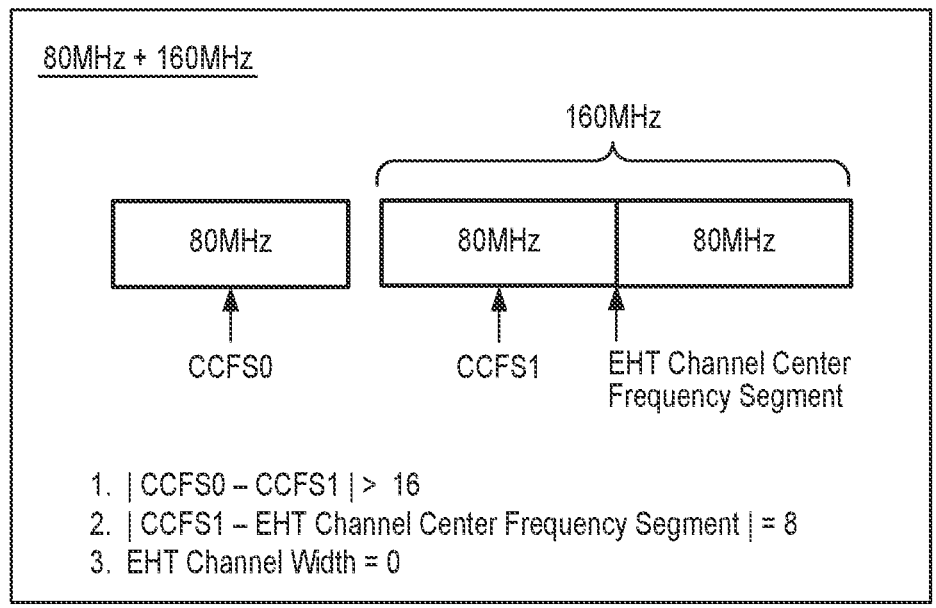
FIG. 6 is a view for explaining operation information of which a communication apparatus is notified if a frequency bandwidth of 80+160 MHz is used.

FIG. 6 is a view for explaining the operation information of which the communication apparatus is notified if a frequency bandwidth of 80+160 MHz is used. As described above, a notification of CCFS0, CCFS1, and Channel Width as information of 80 MHz on the low frequency side (in the former half) of 80+160 MHz is made using the management frame defined by the legacy standard. In addition to the information of 80 MHz on the low frequency side, EHT Channel Center Frequency Segment (field 307) and EHT Channel Width (field 308) described above are used. At this time, EHT Channel Center Frequency Segment represents a channel value corresponding to the center frequency of 160 MHz on the high frequency side, and EHT Channel Width has a value of 0 indicating 240 MHz. Expressions (1) and (2) in FIG. 6 indicate that 80 MHz on the low frequency side (in the former half) of 240 MHz is not adjacent to 160 MHz on the high frequency side (in the latter half). Furthermore, it is possible to make a notification of a frequency channel used for the frequency bandwidth of 80+160 MHz based on the values of CCFS0, CCFS1, and EHT Channel Center Frequency Segment.

Figure 7:
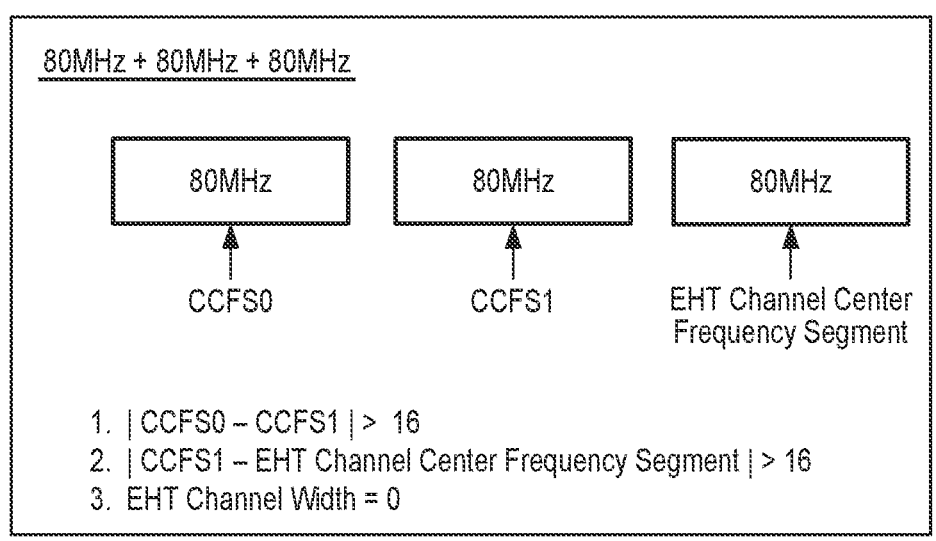
FIG. 7 is a view for explaining operation information of which a communication apparatus is notified if a frequency bandwidth of 80+80+80 MHz is used.

FIG. 7 is a view for explaining the operation information of which the communication apparatus is notified if a frequency bandwidth of 80+80+80 MHz is used. As described above, a notification of CCFS0, CCFS1, and Channel Width as information of 160 MHz on the low frequency side (in the former half) of 80+80+80 MHz is made using the management frame defined by the legacy standard. In addition to the information of 160 MHz on the low frequency side, EHT Channel Center Frequency Segment (field 307) and EHT Channel Width (field 308) described above are used. At this time, EHT Channel Center Frequency Segment represents a channel value corresponding to the center frequency of 80 MHz on the high frequency side, and EHT Channel Width has a value of 0 indicating 240 MHz. Expressions (1) and (2) in FIG. 7 indicate that all the frequency bandwidths of 80 MHz of 240 MHz are not adjacent to each other. Furthermore, it is possible to make a notification of a frequency channel used for the frequency bandwidth of 80+80+80 MHz based on the values of CCFS0, CCFS1, and EHT Channel Center Frequency Segment.

[Modification]

Table 4 shows a modification of the components of the EHT Operation Element 301 according to the above embodiment. If a use frequency bandwidth is designated using the EHT Operation Element 301, it is possible to readily designate a frequency bandwidth by extending the contents of the Control field 306, as shown in Table 4. For example, if the EHT Channel Width field 308 (frequency bandwidth information for wireless communication) has 0, this may indicate that the use frequency bandwidth is 160 MHz or less, if the EHT Channel Width field 308 has 1, this may indicate that the use frequency bandwidth is 240 MHz, and if the EHT Channel Width field 308 has 2, this may indicate that the use frequency bandwidth is 320 MHz. The name and bit position and size of each field/subfield are not limited to those described in the table, and pieces of similar information may be stored with different field/subfield names and sizes in a different order. If the EHT Channel Width field 308 is defined, as shown in Table 4, it is possible to make a notification of the frequency bandwidth and a notification of the frequency channel by changing the setting to the EHT Channel Width field 308=1 in FIGS. 4 to 7.

TABLE 4

| Bit Position | Subfield | Number of Bits | Description |
|---|---|---|---|
| Control B0-B1 | EHT Channel Width | 2 | 0 indicates that use frequency bandwidth is 160 MHz or less. 1 indicates that use frequency bandwidth is 240 MHz. 2 indicates that use frequency bandwidth is 320 MHz. |
| B2-B7 | Reserved | 6 | reserved region |

According to the above-described embodiment, when performing wireless communication with a partner apparatus in a frequency bandwidth of 240 MHz or more, it is possible to appropriately make a notification of operation information to be used for wireless communication. Note that this embodiment has mainly explained the notification procedure of the operation information. However, the communication apparatus can be configured to receive the operation information, as matter of course. In this case, the communication unit 206 shown in FIG. 2A serves as a means for receiving the above-described operation information from another communication apparatus.

According to the present invention, operation information for wireless communication when performing wireless communication in a frequency bandwidth of 240 MHz or more is appropriately communicated.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus, comprising:
communication unit configured to communicate, with another communication apparatus, a management frame including Channel Width field, Channel Center Frequency Segment 0 (CCFS0) field, and Channel Center Frequency Segment 1 (CCFS1) field,
wherein the Channel Width field indicating a channel width is included in EHT Operation Information field complying with a standard of an IEEE802.11 series, and
the channel width is indicated using a value selected from a plurality of values including at least a first value and a second value, wherein the first value indicates a frequency bandwidth of 160 MHz, and the second value indicates a frequency bandwidth of 320 MHz,
the Channel Width indicates a total frequency bandwidth used for wireless communication, the total frequency bandwidth includes a primary frequency bandwidth and a secondary frequency bandwidth, and
in a case where a specific operation setting is set to the communication apparatus such that the entire frequency bandwidth used by the communication apparatus for the wireless communication exceeds 160 MHz, the CCFS0 indicates information regarding a center frequency of a frequency band corresponding to the primary frequency bandwidth, and the CCFS1 indicates information of a center frequency of a frequency band corresponding to the entire frequency bandwidth.

2. The communication apparatus according to claim 1, wherein the management frame is a management frame complying with the standard of the IEEE802.11 series.

3. The communication apparatus according to claim 1, wherein the management frame is one of Beacon frame, Probe Response frame, and Association Response frame s.

4. The communication apparatus according to claim 1, further comprising a hardware for executing image capturing processing.

5. The communication apparatus according to claim 1, further comprising a touch panel display accepting a user operation and presenting information to a user.

6. The communication apparatus according to claim 1, further comprising an accepting unit configured to accept an operation for setting the frequency bandwidth for the wireless communication.

7. The communication apparatus according to claim 1, wherein the communication unit comprises a function for performing wireless communication complying with the Bluetooth standard and/or a function for performing wireless communication complying with the Near Field Communication (NFC) standard.

8. The communication apparatus according to claim 1, wherein the communication unit comprises a function for performing wireless communication complying with the Ultra Wideband (UWB) standard.

9. The communication apparatus according to claim 1, wherein the specific operation setting uses a total frequency bandwidth of 240 MHz using a combination of a continuous 80 MHz frequency band and a continuous 160 MHz frequency band that is not adjacent to the continuous 80 MHz frequency band.

10. A control method for a communication apparatus, comprising:
communicating, with another communication apparatus, a management frame including Channel Width field, Channel Center Frequency Segment 0 (CCFS0) field, and Channel Center Frequency Segment 1 (CCFS1) field,
wherein the Channel Width field indicating a channel width is included in EHT Operation Information field complying with a standard of an IEEE802.11 series, and
the channel width is indicated using a value selected from a plurality of values including at least a first value and a second value, wherein the first value indicates a frequency bandwidth of 160 MHz, and the second value indicates a frequency bandwidth of 320 MHz,
the Channel Width indicates a total frequency bandwidth used for wireless communication, the total frequency bandwidth includes a primary frequency bandwidth and a secondary frequency bandwidth, and
in a case where a specific operation setting is set to the communication apparatus such that the entire frequency bandwidth used by the communication apparatus for the wireless communication exceeds 160 MHz, the CCFS0 indicates information regarding a center frequency of a frequency band corresponding to the primary frequency bandwidth, and the CCFS1 indicates information of a center frequency of a frequency band corresponding to the entire frequency bandwidth.

11. A non-transitory computer-readable storage medium storing a program for causing a computer to function as a communication apparatus, the communication apparatus comprising:

communication unit configured to communicate, with another communication apparatus, a management frame including Channel Width field, Channel Center Frequency Segment 0 (CCFS0) field, and Channel Center Frequency Segment 1 (CCFS1) field, wherein the Channel Width field indicating a channel width is included in EHT Operation field complying with a standard of an IEEE802.11 series, and the channel width is indicated using a value selected from a plurality of values including at least a first value and a second value, wherein the first value indicates a frequency bandwidth of 160 MHz, and the second value indicates a frequency bandwidth of 320 MHz, the Channel Width indicates a total frequency bandwidth used for wireless communication, the total frequency bandwidth includes a primary frequency bandwidth and a secondary frequency bandwidth, and in a case where a specific operation setting is set to the communication apparatus such that the entire frequency bandwidth used by the communication apparatus for the wireless communication exceeds 160 MHz, the CCFS0 indicates information regarding a center frequency of a frequency band corresponding to the primary frequency bandwidth, and the CCFS1 indicates information of a center frequency of a frequency band corresponding to the entire frequency bandwidth.

* * * * *